US009146848B2

(12) United States Patent
Foltin et al.

(10) Patent No.: US 9,146,848 B2
(45) Date of Patent: Sep. 29, 2015

(54) LINK TRAINING FOR A SERDES LINK

(71) Applicant: Hewlett-Packard Development Company, L.P., Houston, TX (US)

(72) Inventors: Martin Foltin, Fort Collins, CO (US); Gregg B. Lesartre, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 262 days.

(21) Appl. No.: 13/873,567

(22) Filed: Apr. 30, 2013

(65) Prior Publication Data

US 2014/0324746 A1 Oct. 30, 2014

(51) Int. Cl.
*G06F 3/00* (2006.01)
*G06F 12/00* (2006.01)

(52) U.S. Cl.
CPC ...................................... *G06F 12/00* (2013.01)

(58) Field of Classification Search
CPC ........................................................ G06F 12/00
See application file for complete search history.

(56) References Cited

U.S. PATENT DOCUMENTS

| 6,718,139 | B1 | 4/2004 | Finan et al. | |
| 7,461,195 | B1* | 12/2008 | Woodral | 710/313 |
| 7,523,215 | B1* | 4/2009 | Robinson et al. | 709/236 |
| 7,647,431 | B2 | 1/2010 | Dalton et al. | |
| 7,966,443 | B2* | 6/2011 | Grundy et al. | 711/5 |
| 2002/0122503 | A1* | 9/2002 | Agazzi | 375/316 |
| 2005/0174271 | A1 | 8/2005 | Carley | |
| 2005/0251595 | A1* | 11/2005 | Lesartre | 710/71 |
| 2007/0112996 | A1* | 5/2007 | Manula et al. | 710/310 |
| 2009/0257514 | A1* | 10/2009 | Connolly et al. | 375/257 |
| 2011/0161544 | A1 | 6/2011 | Chengson et al. | |
| 2012/0082463 | A1* | 4/2012 | Kasprzyk | 398/140 |

OTHER PUBLICATIONS

Chen, Dianyong, "SerDes Transceivers for High-speed Serial Communications," (Research Paper), pp. 1-31, Available at http://www.doe.carleton.canddchen/publications/serdes.pdf (last accessed on Apr. 30, 2013).

* cited by examiner

*Primary Examiner* — Alan Chen
(74) *Attorney, Agent, or Firm* — International IP Law Group, PLLC

(57) ABSTRACT

A computing system can include a memory controller and a first storage device. The first storage device is to receive a serially encoded request and forward the serially encoded request to a second storage device before deserializing the serially encoded request. The first storage device is also to return a training sequence from the target storage device to the memory controller. The first storage device is additionally to return a response from the target storage device to the memory controller.

14 Claims, 4 Drawing Sheets

LINK TRAINING FOR A SERDES LINK

BACKGROUND

Serializer/deserializer (SERDES) links are used for communication in computing systems. A SERDES link includes a serializer to serialize outgoing parallel data, such as data from a bus, into serial data. The SERDES link also includes a deserializer to deserialize incoming serial data to parallel data. A SERDES link is popular in computing systems employing high speed, power efficient communications.

BRIEF DESCRIPTION OF THE DRAWINGS

Certain examples are described in the following detailed description and in reference to the drawings, in which.

DETAILED DESCRIPTION OF SPECIFIC EMBODIMENTS

SERDES links provide an efficient communication channel for a memory controller managing multiple components, such as storage devices, arranged in chains or trees to access a multitude of components at high speeds. The memory controller sends a request over the SERDES link to access a particular component, the target device, to the components. The target device returns a response to the memory controller. The request and the response can be forwarded by the other components in the system. SERDES links for communication between components in a modern computing system can provide an option for delivering communication bandwidth using the fewest physical connections (e.g., pins) and with the best power efficiency as measured by bits transferred per unit power. A training sequence is initiated by the memory controller when the memory controller first communicates with the components, in order to align or configure the components. Aligning the components ensures that the components are able to communicate with the memory controller and receive messages from the controller.

Because SERDES links are point to point connections, a large number of SERDES links are employed in large configurations of components, or significant latency is added to reach across a network including several SERDES links. Latency can be imposed by multiple "hops" through a SERDES connected network when a computing system includes a large number of components.

Bus-based solutions allow a broader fan out of components than a SERDES link. However, bus-based solutions suffer from lower bit rates and lower power efficiencies as compared to SERDES links.

A fast training sequence can be initiated by the target device to align the controller with the target device in order to receive the target device's response. By designing the training sequence to complete while a response is being formed by a target device, latency due to the SERDES link training can be decreased or eliminated. Training allows high speed communication on the SERDES without introducing communication errors due to lane skew or mismatched signal sampling. In a high speed SERDES link, the training ensures the SERDES receiver is calibrated to the transmitter, and the communication channel.

Furthermore, latency can also be decreased by forwarding requests through components before processing the request in each component. By employing the fast training sequence and forwarding the request before processing the request, the benefits of communication efficiencies afforded by a SERDES link can be achieved, while minimizing the latency each access to a target component experiences. These benefits are achieved even in the case of a large number of components used to achieve the scale of the solution. Further, the methods can be employed in a tree topology, and therefore scaled to larger memory capacities.

Figure 1:
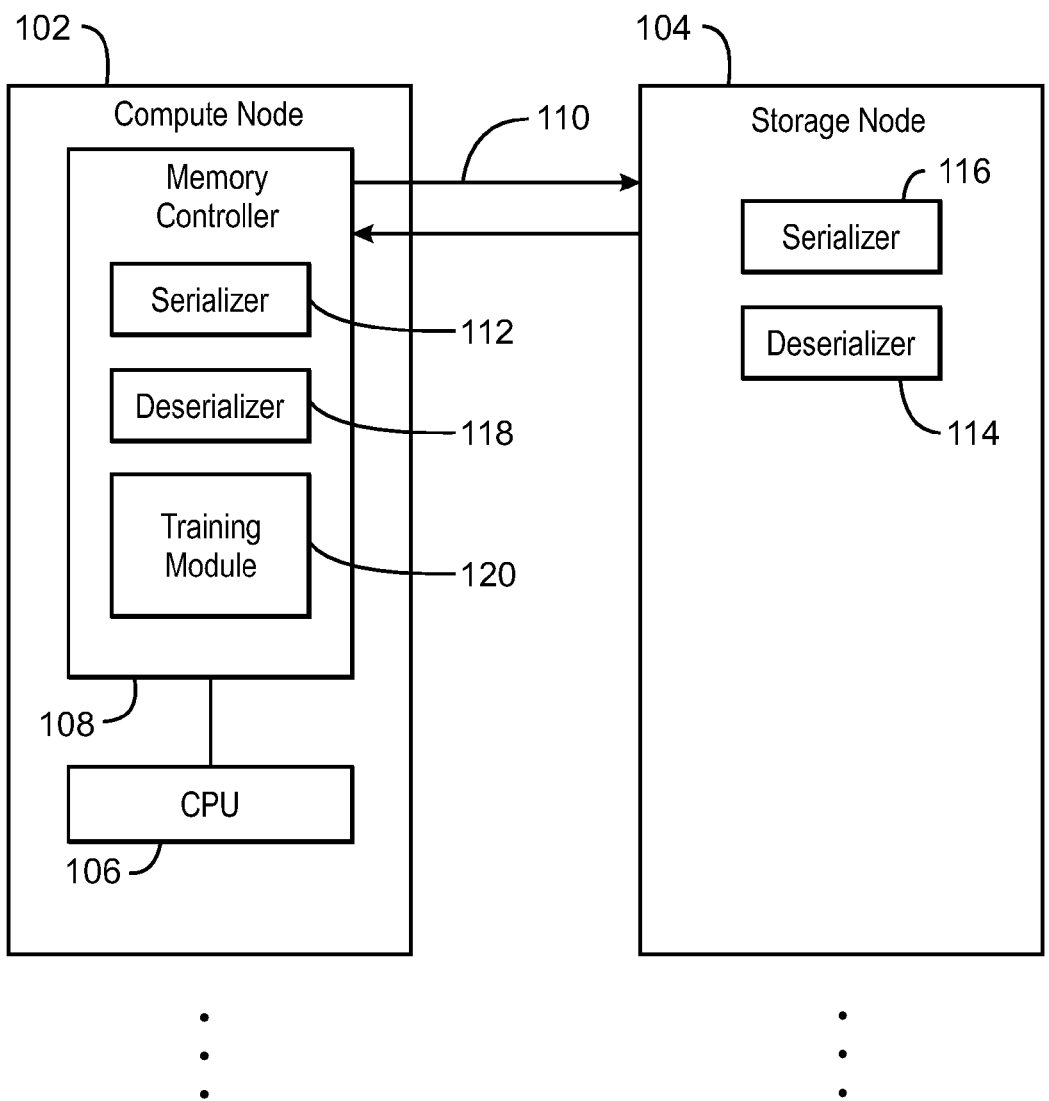
FIG. 1 is a block diagram of some examples of a computing system.

FIG. 1 is a block diagram of some examples of a computing system. The computing system 100 includes a number of nodes, such as a computing node 102 and a storage node 104. Storage node 104 can be accessed via cache line access. The computing system 100 can include several compute nodes and storage nodes, such as several tens or even thousands of compute nodes and storage nodes.

The computing device 100 also includes a storage node 104. Storage node 104 is a collection of storage, such as a collection of storage devices, for storing a large amount of data. In some examples, storage node 104 is used to backup data for computing system 100. In some examples, the computing device 100 includes a single storage node 104. In some examples, the computing device 100 includes multiple storage nodes 104. A storage node 104 is a collection of storage, such as a collection of storage devices, for storing a large amount of data. In some examples, storage node 104 is an array of disk drives. Computing device 100 can include a single storage node 104 or multiple storage nodes 104.

Storage node 104 can be accessed by a single computing node 102 or multiple computing nodes 102. In some examples, a single storage node 104 is associated with each computing node 102. In some examples, a single storage node 104 is accessed by multiple computing nodes 102.

The compute nodes 102 include a central processing unit (CPU) 106 to execute stored instructions. The CPU 106 can be a single core processor, a multi-core processor, or any other suitable processor. In some examples, the compute node 102 includes a single CPU. In some examples, the compute node 102 includes multiple CPUs, such as two CPUs, three CPUs, or more. In some examples, the compute node 102 includes at least one CPU 106. In some examples, the CPUs 106 include local memory and local memory controllers.

The compute node 102 can also include a memory controller 108. In examples, compute node 102 can have multiple memory controllers 108, each memory controller 108 interfacing with a portion of storage or a storage device. The memory controller 108 accesses the storage node 104.

The memory controller 108 is communicably coupled to the storage node 104 via a serializer/deserializer (SERDES) link 110. The SERDES link 110 includes an outgoing communication pathway to transfer information from the memory controller 108 to the storage node 104 and an ingoing communication pathway to transfer information from the storage node 104 to the memory controller 108.

The memory controller 108 includes a serializer 112 to serialize outgoing parallel data (e.g., a request) to serial data. The serialized data is sent via the SERDES link 110 to the storage node 104. The storage node 104 includes a deserializer 114 to deserialize the serialized data received via the SERDES link 110 into parallel data. The storage node 104 also includes a serializer 116 to serialize parallel data into serial data before sending the data to the memory controller 108. The memory controller 108 includes a deserializer 118 to deserialize the data from the storage node into parallel data.

The memory controller 108 includes a training module 120. The training module 120 initiates training sequences to configure the storage node(s) 104. The training sequence configures the storage node(s) 104 so that the storage nodes can communicate with the memory controller 108.

The training module 120 also receives a training sequence from a target storage node 104 to configure the memory controller 108 to receive data from the storage node 104. The training sequence from the storage node 104 configures the memory controller 108 and prepares the memory controller 108 to receive and process a response from the target storage node 104. The training sequence is preferably designed to complete before the storage node 104 is ready to send a response to the memory controller 108.

It is to be understood the block diagram of FIG. 1 is not intended to indicate that the computing system 100 is to include all of the components shown in FIG. 1 in every case. Further, any number of additional components can be included within the computing system 100, depending on the details of the specific implementation. Further, though described as a computer system, the system may in fact be any implementation that controls a multitude of other devices through an efficient and fast communication SERDES. Additionally, while the controller is described as a memory controller to communicate with a storage device(s), the controller can be any type of controller to communicate with any type of system devices with high communication efficiency and low latency.

Figure 2:
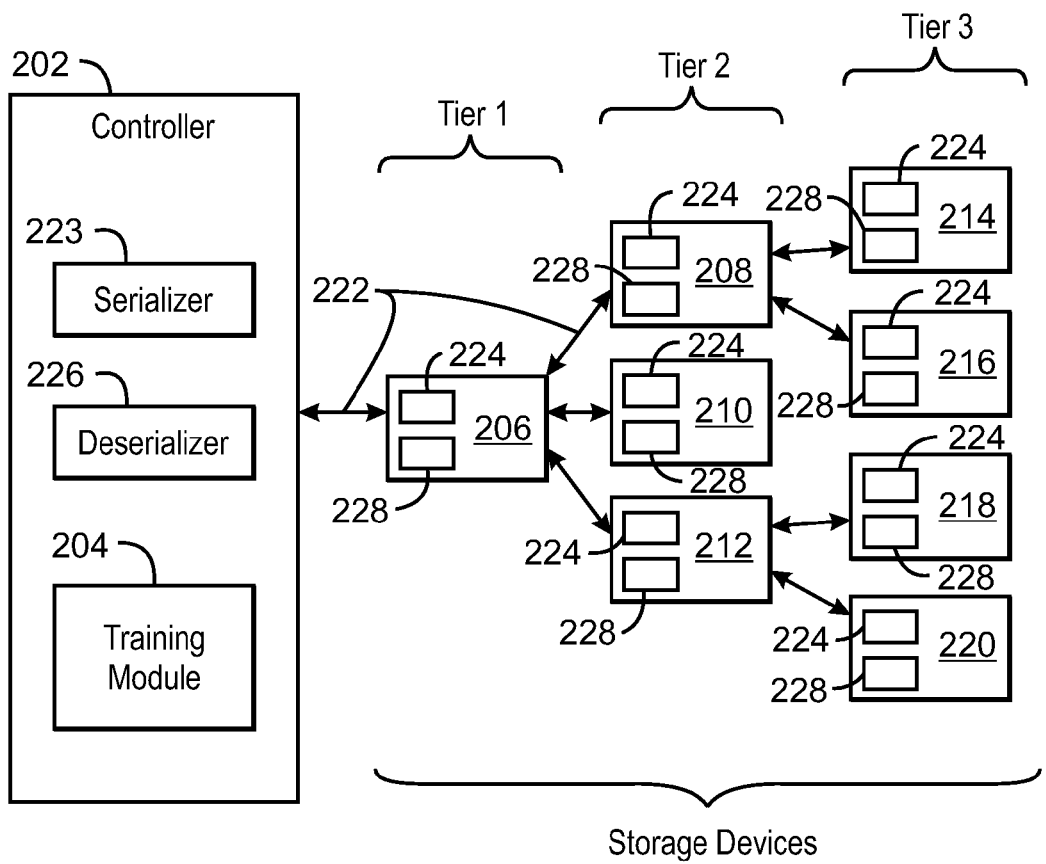
FIG. 2 is a block diagram of some examples of a SERDES link configuration.

FIG. 2 is a block diagram of some examples of a memory system 200. The memory system 200 includes a memory controller 202. The controller 202 includes a training module 204. The training module initiates training sequences for the controller 202. The memory controller 202 interacts with, and controls access to, a storage device. For example, the memory controller 202 can interface between a processor, such as CPU 106, and the storage device 104.

The controller 202 can access storage devices 206-220. The controller 202 can be communicably coupled to the storage devices via a serializer/deserializer (SERDES) link 222. For example, the controller 202 can include a serializer 223 to serialize a request. Each storage device 206-220 can include a deserializer 224 to deserialize the request. The controller 202 can also include a deserializer 226 for deserializing information received from the storage devices 206-220 and each storage device 206-220 can include a serializer 228 for serializing information to be sent to the controller 202.

The storage devices 206-220 can be organized in a tree topology. For example, the storage device 206 can be Tier 1 of a tree. Storage device 206 can be coupled to storage devices 208-212, which are Tier 2 of the tree. Storage device 208 can be coupled to storage devices 214 and 216 and storage device 212 can be coupled to storage device 218 and 220. Storage devices 214-220 can be Tier 3 of the tree. Each of the storage devices 206-220 can be coupled to multiple other storage devices 206-220. Storage devices in a nominally higher tier are referred to herein as upstream devices relative to storage devices in a nominally lower tier. Conversely, storage devices in a nominally lower tier are referred to herein as downstream devices relative to storage devices in a nominally higher tier. For example, the storage devices 214-220 in Tier 3 of the tree are considered to be upstream to the storage devices 206-212 in Tiers 1-2 of the tree. The storage device 206, in Tier 1, is considered to be downstream to the storage devices 208-220 of Tiers 2-3. The tree illustrated in FIG. 2 has been simplified for ease of explanation. The tree can include any number of additional storage devices and each Tier of the tree can include any number of additional storage devices. Further, the tree is not limited to the three Tiers shown in the memory system 200, but can include any number of additional Tiers not shown.

The controller 202 prepares a request to access a particular storage device of storage devices 206-220, known as the target device. The training module 204 initiates an outbound training sequence. The outbound training sequence is a training sequence originating from the controller 202 to train the deserializing receivers of the storage devices 206-220, aligning the receiver to the signal that propagates to the receivers. For example, the first time the controller 202 interacts with the storage devices 206-220, the training module 204 can initiate the outbound training sequence. The outbound training sequence initializes and aligns the storage devices' 206-220 deseriallizer 224 to correctly receive sent data. For example, the outbound training sequence establishes contact between the controller 202 and the storage devices 206-220, determines signaling rates, aligns sampling of the data to properly place the received serial data into parallel formatted data, and optimizes tuning parameters to configure the storage devices 206-220 to the best configuration to communicate with the controller 202.

When the training is complete, the controller 202 sends a request to access the target device. The request can be any type of request. For example, the request can be a storage device access request, such as a read request or a write request. The request can include an address detailing the memory location to which the controller 202 requests access. The request can be sent from the controller 202 to the storage devices 206-220. The request can be sent as bitstreams of data along the SERDES links 222. For example, the controller 202 can send the request to the storage device 206 of Tier 1. The storage device 206 can forward the request to the storage devices 208-212 of Tier 2. The storage devices 208-212 can forward the request to each of the storage devices 214-220 of Tier 3.

Each of the storage devices 206-220 forwards the request before processing the request, i.e., before deserializing the request. For example, each of the storage devices 206-220 can directly buffer the request without deserializing the bitstream. By forwarding the request before processing the request, the request can route through the storage devices 206-220 in a minimum amount of time, such as 1-2 ns in 40 nm CMOS. After the storage device 206 has forwarded the request to the storage devices 208-212 of Tier 2, the storage device 206 deserializes and decodes the request. After processing the request, the storage device 206 determines if the storage device 206 is the target device. If the storage device 206 is not the target device, the storage device 206 can make no response to the request. If the storage device 206 is not the target device, the storage device 206 determines if the target device is upstream of the storage device 206. If the target device is upstream of the storage device 206, the storage device 206 prepares the downstream return path to buffer the target device's response through the storage device 206 downstream toward the controller. The storage device 206 monitors the bitstreams of data. Messages from the upstream target device are received in the storage device 206 and forwarded to the controller by the storage device 206. The storage device 206 forwards the message from the target device without processing the message.

The message can be an inbound training sequence. The inbound training sequence originates from the target device to train the deserializing receiver of the controller 202, aligning the receiver to the signal that propagates to the receiver from the target device. The inbound training sequence can be forwarded to the controller 202 via the downstream storage devices. The inbound training sequence can be sent while the target device is preparing a response to the request. By initiating the inbound training sequence while preparing the response, latency can be decreased. The inbound training sequence can be initiated by the target device when the device is first targeted by the controller 202. For example, the inbound training sequence can be initiated, or sent only when the device is first targeted by the controller. If the target device was targeted by the controller in the previous request, the target device can prepare the response without initiating an additional inbound training sequence. If the target device was not targeted in the previous request, the target device can initiate the inbound training sequence and send the inbound training sequence to the controller 202.

For example, illustrated in Table 1, in a first request, storage device 216 was the target device. In responding to the request, storage device 216 initiated an inbound training sequence. In a second request, storage device 216 was again the target device and did not prepare the inbound training sequence. In a third request, the storage device 218 was the target device and the storage device 218 prepared an inbound training sequence. In a fourth request, the storage device 216 is again the target and, as the storage device 216 was not targeted in the third request, the storage device 216 again prepares an inbound training sequence.

TABLE 1

Example of when an inbound training sequence is initiated

| Request number | Target Device | Initiated Inbound Training Sequence? |
| --- | --- | --- |
| 1 | Storage device 216 | Yes |
| 2 | Storage device 216 | No |
| 3 | Storage device 218 | Yes |
| 4 | Storage device 216 | Yes |

The inbound training sequence is received in the training module 204 of the controller 202. The training module 204 recognizes the inbound training sequence received from the target device and configures the controller 202. The inbound training sequence prepares the controller 202 to receive the response from the target device. After completion of the inbound training sequence, the controller 202 is ready to process the response to be received from the target device.

The response can be any suitable response to the request. For example, the response can be a return of requested data. In some examples, the response can be a notice of a completion or failure signal. The response can also include information such as link credits, the occurrence of data corruption, and other status information.

If the storage device 206 is the target device, the storage device 206 routes the request internally for processing. For example, during processing, the internal data arrays of the storage device 206 can be accessed to find requested data. The storage device 206 also prepares a return path driver to accept a response from the internal logic. Additionally, the storage device 206 initiates an inbound training sequence and sends the inbound training sequence to the controller 202 if the storage device 206 was not targeted in the previous request. The storage device 206 also prepares a response to the request. The storage device 206 can initiate and send the inbound training sequence while preparing the response. If the storage device 206 was targeted in the previous request, the storage device 206 can prepare the response without initiating an inbound training sequence. By not repeating the inbound training sequence when the storage device 206 was targeted in the previous request, latency is decreased. Latency is additionally decreased by preparing the inbound training sequence while the storage device 206 is preparing the response. The inbound training sequence is preferably configured to be completed by the controller 202 before the response is ready to be sent from the target device to the controller 202.

If the target device is a Tier 1 storage device, the response to the request is sent directly to the controller 202, without involving intermediate storage devices. However, if the target device is a Tier 2 storage device 208-212, the response is sent to the Tier 1 storage device 206, which forwards the response to the controller 202. If the target device is a Tier 3 storage device 214-220, the response is sent to the Tier 2 storage devices 208-212, which forward the response to the Tier 1 storage device 206 to forward the response to the controller 202. Each intermediate storage device, i.e., storage device that forwards messages from the target device to the controller 202, effectively configures itself to behave as a "wire". Wire delays between components can vary in length. This variability can cause the configuration resulting from the training of the link to fail to correctly receive data from a different target device than it was trained with. By retraining, i.e., realigning, the controller 202 each time the target device is changed, the receiving deserializer 226 can be reconfigured to correctly receive the transmitted data. Because of the potential delay when changing to a new target device, the SERDES link configuration 200 may perform best when used to repeatedly access a particular storage device, rather than repeatedly changing target devices for small accesses.

It is to be understood the block diagram of FIG. 2 is not intended to indicate that the memory system 200 is to include all of the components shown in FIG. 2 in every case, or to include the configuration shown in FIG. 2 in every case. Further, any number of additional components can be included within the memory system 200, depending on the details of the specific implementation. In addition, while a memory system 200 is described herein, the system is not restricted to a memory system, but can include any type of system that communicates with a multitude of component devices with high communication efficiency and low latency.

Figure 3:
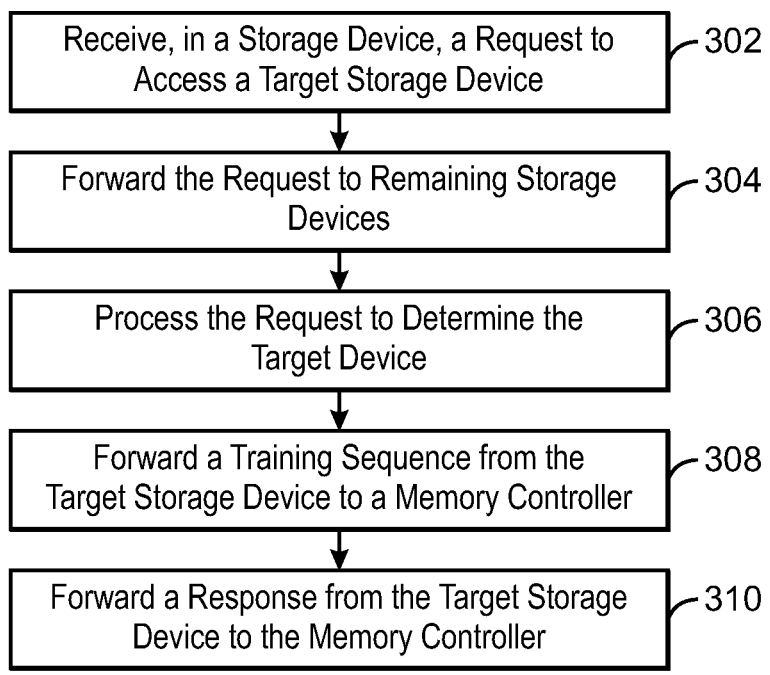
FIG. 3 is a process flow diagram of some examples of a method of utilizing a SERDES link configuration.

FIG. 3 is a process flow diagram of some examples of a method 300 of utilizing a SERDES link configuration, such as the SERDES link configuration of memory system 200. At block 302, a request to access a target device can be received in a device. For example, the device can be a storage device. The request can be any suitable request, such as a read request or a write request to a storage device. The request can be received from a controller, such as controller 202. The controller can initiate a training sequence to configure the device before sending the request.

At block 304, the device can forward the request to remaining devices. For example, the device can be one of a plurality of devices. The device can forward the request to the remaining devices of the plurality of devices. In some examples, the plurality of devices can be communicably coupled in a tree topology. Downstream tiers of the tree of devices can forward the request to upstream tiers of the tree of devices.

At block 306, the device can process the request to determine the target device. The target device is the device to which the request refers and requests access. The device can process the request after forwarding the request in order to decrease latency. Processing can include deserializing the request. For example, the request can be sent through the system via SERDES links. The request can be serialized before being sent by the controller. The request can be deserialized by the device in order to process the request.

At block 308, the device can forward a training sequence from the target device to the controller. The training sequence can be sent by the target device while the target device prepares a response to the request. The training sequence can configure the controller to receive the response from the target device. In some examples, the target device can send the training sequence only when the target device is first targeted. For example, if the target device was targeted in the previous request, the target device can prepare a response without sending the training sequence. If the target device was not targeted in the previous request, the target device can send a training sequence, regardless of whether the target device was targeted in a request before the previous request.

At block 310, the device can forward a response from the target device to the controller. The response can be any suitable response to the request. For example, the response can be a return of requested data or the response can be a notice of completion or failure of a requested action. The response can further be an indication of the status of the target device.

It is to be understood that the process flow diagram of FIG. 3 is not intended to indicate that the blocks of the method 300 are to be executed in any particular order, or that all of the blocks of the method 300 are to be included in every case. Further, any number of additional blocks not shown in FIG. 3 can be included within the method 300, depending on the details of the specific implementation.

Figure 4:
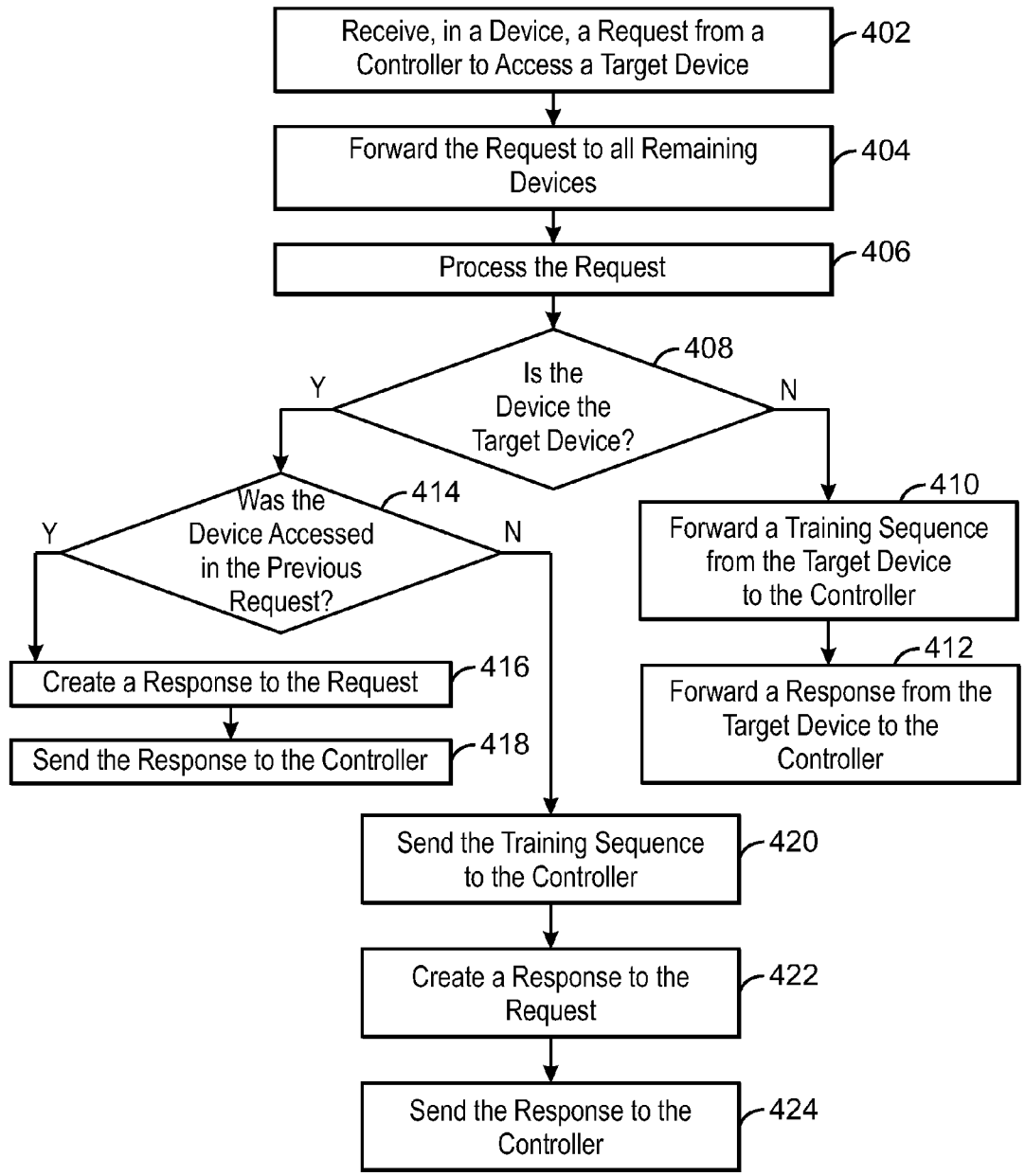
FIG. 4 is a process flow diagram of some examples of a method of utilizing a SERDES link configuration.

FIG. 4 is a process flow diagram of some examples of a method 400 of utilizing a SERDES link configuration, such as SERDES link configuration of memory system 200. At block 402, a request to access a target device can be received in a device. For example, the device and the target device can be storage devices. The request can be any suitable request, such as a read request or a write request to a storage device. The request can be received from a controller, such as controller 202. The controller can initiate a training sequence to configure the device before sending the request.

At block 404, the device can forward the request to remaining devices. For example, the device can be one of a plurality of devices. The device can forward the request to the remaining devices of the plurality of devices. In some examples, the plurality of devices can be communicably coupled in a tree topology. Downstream tiers of the tree of devices can forward the request to upstream tiers of the tree of devices.

At block 406, the device can process the request. The device can process the request after forwarding the request, in order to decrease latency. Processing can include deserializing the request. For example, the request can be sent through the system via SERDES links. The request can be serialized before being sent by the controller. The request can be deserialized by the storage device in order to process the request.

At block 408, the device can determine if the device is the target device. The target device is the device to which the request refers and requests access. If the device is not the target device, at block 410 the device can forward a training sequence from the target device to the controller. The training sequence can be initiated and sent by the target device while the target device prepares a response to the request. The training sequence can configure the controller to receive the response from the target device. In some examples, the target device can initiate and send the training sequence only when the target device is first targeted. For example, if the target device was targeted in the previous request, the target device can prepare a response without initiating the training sequence. If the target device was not targeted in the previous request, the target device can prepare a training sequence, regardless of whether the target device was targeted in a request before the previous request.

At block 412, the target device can forward a response from the target device to the controller. The response can be any suitable response to the request. For example, the response can be a return of requested data or the response can be a notice of completion or failure of a requested action. The response can further be an indication of the status of the target device.

If the device is the target device, at block 414 the device can determine if the device was accessed in the previous request. If the device was accessed in the previous request, at block 416, the device can create a response to the request. At block 418, the device can send the response to the controller. In some examples, the device can send the response to the controller by sending the response to devices located downstream to the device, the downstream devices forwarding the response to the controller. If the target device is the most downstream located device, the device can send the response directly to the controller.

If the device was not accessed in the previous request, at block 420, the device can send a training sequence to the controller, such as by sending the training sequence to downstream devices to forward to the controller. The training sequence configures the controller to receive the response from the target device. At block 422, the device can create a response to the request. The training sequence can be prepared and sent while the device creates the response. At block 424, the device can send the response to the controller, such as via downstream devices.

It is to be understood that the process flow diagram of FIG. 4 is not intended to indicate that the blocks of the method 400 are to be executed in any particular order, or that all of the blocks of the method 400 are to be included in every case. Further, any number of additional blocks not shown in FIG. 4 can be included within the method 400, depending on the details of the specific implementation.

EXAMPLE 1

A computing system is described herein. The computing system includes a controller and a first device. The first device is to receive a serially encoded request. The first device is to forward the serially encoded request to a second device before deserializing the serially encoded request. The first device is also to deserialize the serially encoded request to determine a target device. The first device is further to return a training sequence from the target device to the controller. The first device is additionally to return a response from the target device to the controller.

The training sequence can be sent by the target device while the target device prepares the response to the serially encoded request. The devices can be arranged in a tree topology and each device can be coupled to a device, the controller, or a combination thereof, via a SERDES link. The second device can forward the request to at least a third device before deserializing the serially encoded request. The target device can send the training sequence only on a first access of the target device. When the memory controller sends a request to a new target device, the new target device can send a new training sequence to properly initialize the controller when the new target device is first accessed. When the controller targets a first target device after the new target device, the first target device can send a training sequence to initialize the controller when the controller first re-accesses the first target device. The training sequence can be sent by the target device while the target device prepares the response to the serially encoded request. The devices can be arranged in a tree topology and each device can be coupled to a device, the controller, or a combination thereof, via a SERDES link. The second device can forward the request to at least a third device before deserializing the serially encoded request. The target device can send the training sequence only on a first access of the target device. When the memory controller sends a request to a new target device, the new target device can send a new training sequence to properly initialize the controller when the new target device is first accessed. When the controller targets a first target device after the new target the device, the first target device can send a training sequence to initialize the controller when the controller first re-accesses the first target device.

EXAMPLE 2

A method is described herein. The method includes receiving, in a device, a request from a controller to access a target device and forwarding the request to remaining devices. The method also includes processing the request to determine the target device. The method further includes forwarding a training sequence from the target device to the controller. The method additionally includes forwarding a response from the target device to the controller.

Processing the request can include deserializing the request. The method can additionally include, when the device is the target device, creating and sending the training sequence when the device is first accessed by the controller. The method can additionally include the target device sending the training sequence while preparing the response. The method can also include sending a new training sequence when a device is first targeted. The method can further include the device forwarding the request to the remaining devices before processing the request.

EXAMPLE 3

A memory system is described herein. The memory system can include a controller and a plurality of storage devices. Each storage device can be coupled to the controller via a SERDES link. A storage device can receive a serially encoded request from the controller to access a target storage device. The storage device can forward the serially encoded request to remaining storage devices of the plurality of storage devices. The storage device can send a training sequence from the target storage device to the controller.

The storage device can forward the request before deserializing the request. The target storage device can send the training sequence when the target storage device is first accessed by the controller.

What is claimed is:

1. A computing system, comprising:
   a controller; and
   a first device and a second device coupled to the first device in a tree topology via a SERDES link, the first device to:
   receive a serially encoded request;
   forward the serially encoded request to the second device before deserializing the serially encoded request;
   deserialize the serially encoded request to determine a target device;
   return a training sequence from the target device to the controller; and
   return a response from the target device to the controller.

2. The computing system of claim 1, wherein the training sequence is sent by the target device while the target device prepares the response to the serially encoded request.

3. The computing system of claim 1, wherein the second device forwards the request to at least a third device before deserializing the serially encoded request.

4. The computing system of claim 1, wherein the target device sends the training sequence only on a first access of the target device.

5. The computing system of claim 1, wherein when the controller sends a request to a new target device, the new target device sends a new training sequence to properly initialize the controller when the new target device is first accessed.

6. The computing system of claim 5, wherein when the controller targets a first target device after the new target device, the first target device sends a training sequence to initialize the controller when the controller first re-accesses the first target device.

7. A method, comprising:
   receiving, in a device, a serially encoded request from a controller to access a target device;
   forwarding the request to remaining devices before deserializing the serially encoded request;
   processing the serially encoded request to determine the target device;
   forwarding a training sequence from the target device to the controller; and
   forwarding a response from the target device to the controller.

8. The method of claim 7, processing the serially encoded request comprising deserializing the request.

9. The method of claim 7, further comprising, when the device is the target device, creating and sending the training sequence when the device is first accessed by the controller.

10. The method of claim 7, further comprising the target device sending the training sequence while preparing the response.

11. The method of claim 7, further comprising sending a new training sequence when a new device is first targeted.

12. The method of claim 7, further comprising the device forwarding the serially encoded request to the remaining devices before processing the request.

13. A memory system, comprising:
   a controller; and
   a plurality of storage devices, each coupled to the controller via a SERDES link,
   wherein at least one of the plurality of storage devices:
   receives a serially encoded request from the controller to access a target storage device of the plurality of storage devices;
   forwards the serially encoded request to remaining storage devices of the plurality of storage devices;
   sends a training sequence from the target storage device to the controller; and
   sends a response from the target storage device to the controller.

14. The memory system of claim 13, wherein the at least one of the plurality of storage devices forwards the serially encoded request before deserializing the request, and the target storage device sends the training sequence when the target storage device is first accessed by the controller.

* * * * *